July 23, 1968  C. MERCIER  3,393,538
TANNING AND TAWING (OR LEATHER DRESSING) MACHINE
FOR SPLITTING HIDES AND SKINS
Filed Nov. 26, 1965  8 Sheets-Sheet 1

C. MERCIER

3,393,538

TANNING AND TAWING (OR LEATHER DRESSING) MACHINE
FOR SPLITTING HIDES AND SKINS

Filed Nov. 26, 1965

July 23, 1968 A. CREPINSEK 3,393,542

ROTARY CYLINDER LOCK

Filed May 28, 1965 9 Sheets-Sheet 5

INVENTOR.
Alois Crepinsek
BY
Schlesinger, Schlesinger & Arkwright
Attorneys

United States Patent Office 3,393,538
Patented July 23, 1968

3,393,538
TANNING AND TAWING (OR LEATHER DRESS-
ING) MACHINE FOR SPLITTING HIDES AND
SKINS
Christian Mercier, Annonay, Ardeche, France, assignor to
Mercier Freres, Annonay, Ardeche, France
Filed Nov. 26, 1965, Ser. No. 509,815
Claims priority, application France, Dec. 2, 1964,
9,071; Oct. 7, 1965, 9,298
30 Claims. (Cl. 69—10)

ABSTRACT OF THE DISCLOSURE

In a roller feed, band knife, leather splitting machine, the arrangement of the lower feed roller for three line mounting between the rear edge of the work feed table, the surface of a driving drum and a bar rearward and below the line of cutting action; the lower feed roller, the feed table, the driving drum and the bar being mounted for movement as a unit from the knife edge.

In the treatment and preparation of hides and skins, a slitting operation is effected which consists of dividing the hides and skins into two portions with respect to their thickness, so as to form a main portion or thickness generally comprising a "grain-split" side, i.e., the hair-side of hides and skins and a secondary portion or "flesh-split" side, corresponding to the flesh-side. By virtue of the above slitting operation, irregularities in thickness of the hides due to thickness irregularities on the flesh-side are eliminated and a substantially uniform thickness is formed for the grain-split side. Thus the slitting operation produces a grain-split portion of uniform thickness and a flesh-split portion of irregular thickness.

The known machines used to carry out the slitting operation employ a horizontal work table or plane, two cylinders or rollers for driving the hides and skins above the cutting line, one of which rollers is placed above the tensioned length of an endless, flexible cutting blade mounted on two fly-wheels, one of which is a driving fly-wheel and the other a tensioning or stretching fly-wheel, the lower of said rollers being positioned with respect to the tensioned length of the blade so as to be adjustable according to the desired slitting thickness. The latter roller is composed of separate cylindrical elements or rings, said rings being aligned by bearing against a metallic guide bar, the rings being, moreover, supported and driven in rotation by a rotatable cylinder having a peripheral rubber lining. It is the role of the roller, which is formed of the separate but jointly mounted elements or rings, to apply to the hide or skin to be slit, a constant pressure, whatever the differences in thickness of the hides and skins to be slit. Said constant and regular pressure which is determined by the position of the rubber-lined cylinder and by the characteristics of said arrangement establishes an equal and tangential application of the hide or skin to be slit against the upper one-piece roller along a rectilinear line disposed above the cutting or slitting line.

Figure 1:
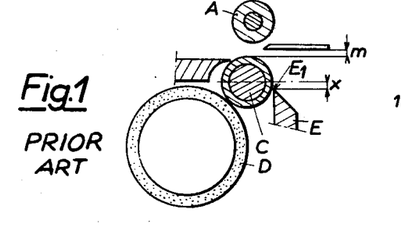
FIGURES 1 and 2 show diagrammatically a known arrangement in which there is independent mounting of the ring roller with respect to its supporting members.
Figure 2:
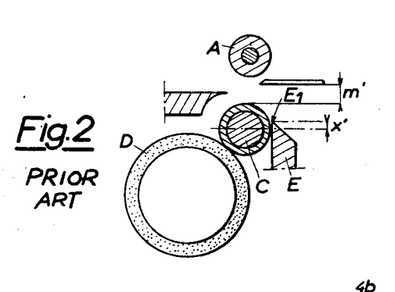

A considerable disadvantage of the known machines is that the modification of the cutting thickness resulting from the distance which separates the cutting edge of the blade and the tangential support on the roller composed of rings (hereinafter referred to as a ring roller) is accompanied by a corresponding positional change between the axis of the ring roller and the upper edge of the guide bar supporting said ring roller. This disadvantage has been illustrated diagrammatically in FIGS. 1 and 2 of the accompanying drawings, which show the roller A mounted above the blade B, the ring roller C and the driving cylinder D which has a peripheral friction lining. The rings of the roller C bear against the bevel-shaped fixed guide bar E adjacent edge $E^1$ thereof to facilitate the discharge of the lower thickness of the hides and skins. There is a relative optimal position between the roller C and the edge $E^1$, so that, if the position of the ring roller is changed with respect to the blade in order to change the cutting thickness, the optimal relative position is also changed, as will be seen readily from FIGS. 1 and 2 illustrating different positions. In FIG. 1, the increase of dimension X, which corresponds to the reduction of the cutting thickness $m$, tends to produce snagging or catching of the rings of the cylinder C. On the other hand, the reduction of X to X' as seen in FIG. 2, which corresponds to an increase of thickness to $m'$, causes wedging or jamming of the ring roller C owing to the introduction and jamming of waste material and other foreign elements into the space which is formed between the rings of the cylinder C and the edge $E^1$.

Another disadvantage of the known machines is associated with the passage of the half-skins, i.e., the skins divided longitudinally into "left" and "right" strips. In this respect the direction of displacement of the blade is dependent upon the particular half skin being slit. Thus, the endless blade will be driven in one direction or the other, as a function of the passage of the right or left strips. During the normal operation of the machine, the stretched or tensioned length of the endless blade is the upper traverse which is guided by rectilinear jaws or clamps along the cutting line. During its travel the blade is sharpened along two faces of a beveled cutting edge by two oppositely placed grindstones which are displaced with respect to each other.

In the opposite driving and moving direction of the blade, the upper part guided by the rectilinear jaws becomes the slack part, and the sharpening of the two faces of the cutting edge of the blade takes place in reverse manner compared to the sharpening in the normal direction, that is, the upper sharpening grindstone in the normal direction of blade travel operates below the lower grindstones in the opposite direction. The reversal of the shifted position of the upper and lower grindstones in the two cutting directions of the blade results in a difference in quality of the slitting operation carried out on the half-skins or so-called "right" strips and "left" strips.

It is an object of the present invention to remedy the above deficiencies and to make substantial improvements in machines which carry out the slitting operation.

The machine according to the invention is mainly characterized by an arrangement, according to which the slitting and the traveling of the hides and skins is effected in a generally inclined plane, while slitting is achieved by a unit which is assembled from elements having fixed relative positions. The unit is mainly composed of a roller constituted of rings, a guide bar and other supporting portions, a frictionally driving cylinder, and a table for introducing the skins, said unit being mounted with respect to the frame of the machine so as to have a vertically adjustable position in order to change the cutting thickness between the blade and the ring cylinder. According to another feature, the adjustment of the position of said unit is effected by means of jacks cooperating with stop-rings of adjustable position. By the term "jack" I mean a hydraulic piston-cylinder arrangement in which the piston is adapted for applying a force under the action of a pressure fluid which is admitted to the cylinder.

The machine is also characterized by arrangements which relate to the mounting of the upper feed roller guided between jaws and bearing against an alignment of compensating cylinders which are carried by an intermediate bridge of several elements, whose alignment can be regulated by the inclination of the end elements, said articulated bridge being carried, in turn, by a rigid main bridge which is parallel to the blade and whose position can be regulated with respect to said blade.

According to other features, the two flywheels, on which the endless blade is mounted, are driven in perfect synchronization, each flywheel being driven by a hydraulic motor, whose driving direction can be reversed to drive the blade in either direction, at will, while a system of hydraulic jacks is mounted both to stretch the blade and also to balance the tensile stresses on the blade and the elements of the machine.

Another features resides in an arrangement according to which one of the two grindstones for sharpening the blade, preferably the lower grindstone, is mounted on a rotating axle in a casing disposed coaxially with respect to the axle of the other fixed grindstone in such a manner that said lower grindstone is able to occupy two symmetrical positions relative to the fixed grindstone with means for immobilizing the lower grindstone in each of the positions, said lower grindstone thus exerting its blade grinding action, in every case, after and following the fixed grindstone, taking into account the direction of displacement imparted to the blade, in a more rational manner.

According to another feature, the sharpening of the blade is effected on the upper traverse of the endless blade, and adjustable pressure members bear against the rear edge of the blade and are synchronized with a pressure member bearing against the rear edge of the blade in the sharpening zone.

According to another feature, the invention provides for contact pieces against the rear edge of the lower traverse of the endless blade in order to position the same with precision, said contact pieces being mounted so as to be manually or automatically adjustable, in synchronism with the device for regulating the contact pieces, against which is supported the rear edge of the upper traverse of the endless blade.

According to another feature, the device for simultaneously displacing the contact pieces against the upper and lower traverses of the blade is combined with means such as a reduction motor operating by the excitation of a photo-electric cell system, the ray of whose emitting lamp is normally hidden by the cutting edge of the upper traverse of the blade so that the wear of said cutting edge activates the reduction motor and produces automatic advance of the upper and lower traverses of the blade until the ray directed onto the cell is again hidden.

According to another feature, the end elements of the intermediate bridge, by means of which the adjustment of the compensating cylinders at the ends is effected, may have an inclination which is adjustable at will by the operator during the slitting operation of a hide according to its quality, its thickness and other features which may bring about a change of the longitudinal supporting profile of the driving cylinder, said adjustments being effected by means of a distributing valve of a hydraulic system which permits regulating the hydraulic pressure in a single-acting jack, in combination with the above-described means.

According to another feature, the play between the mechanical members and, more particularly, the threaded members which ensure the adjustment of the level of the rigid main bridge of the machine is effected automatically, for example by single-acting jacks supported on the fixed supports of the machine, whose pistons exert a pre-established vertical pressure limited by a discharge valve, on the heads of the main bridge, said pressure being determined so as to be slightly greater than the weight of the bridge and of the members and mechanisms carried thereby.

Another feature of the invention is an arrangement of single-acting hydraulic jacks which are mounted at the ends of the frame and whose piston rods act against rollers or other supporting points of the unit carrying the ring roller, so as to regulate the pressure of the hydraulic fluid against said unit and the ring roller, in order to obtain a constant pressure of the ring roller against the hide to be slit despite variations in thickness.

The above and other features, objects, and advantages of the invention will become apparent from the description which follows in conjunction with the accompanying drawings, in which:

FIGURE 11 is a plan view of the machine of FIG. 6;

FIGURE 12 is a diagrammatic plan view which illustrates the simultaneous adjustment device of the pressure members supporting the rear edge of the blade, including the pressure member located in the sharpening zone;

Reference will now be made to the drawings to describe the embodiment of the invention therein given by way of non-restrictive example.

The machine according to the invention comprises a robust and rigid stand or frame 1 made of cast metal or other suitable material which is provided with a transversely extending inclined cut-out portion or recess 1a in which is mounted a longitudinal bed 2 which has a corresponding inclined position; supports 3 are mounted on the frame and a rigid main bridge 4 is mounted on the forward portion of said supports in a vertically adjustable position; a longitudinal front unit 5 is disposed beneath the bridge 4 and is an assembly of various elements which will be enumerated below and whose relative positions cannot be changed. The position of said unit 5 can be adjusted vertically; flywheels 6 and 7 (FIG. 6) carry and drive the endless blade 8, each of said flywheels being carried by a slide block 9 mounted at the ends of the bed 2 in an adjustable position.

The longitudinal front unit 5 is formed of a rigid hollow block 10 which has at its ends bearing elements for mounting a driving roller or cylinder 11 housed inside the block 10 and comprising a peripheral friction lining 11a made of rubber or other suitable material. Also mounted on the inside of the block 10 is a roller or cylinder 12 having multiple rings 12a which are not shown in detail in the drawing, such construction of said roller being well known. The cylinder 11 is preferably mounted in an adjustable position in the block 10, so as to permit to take up the wear and tear of the peripheral rubber lining.

Figure 3:
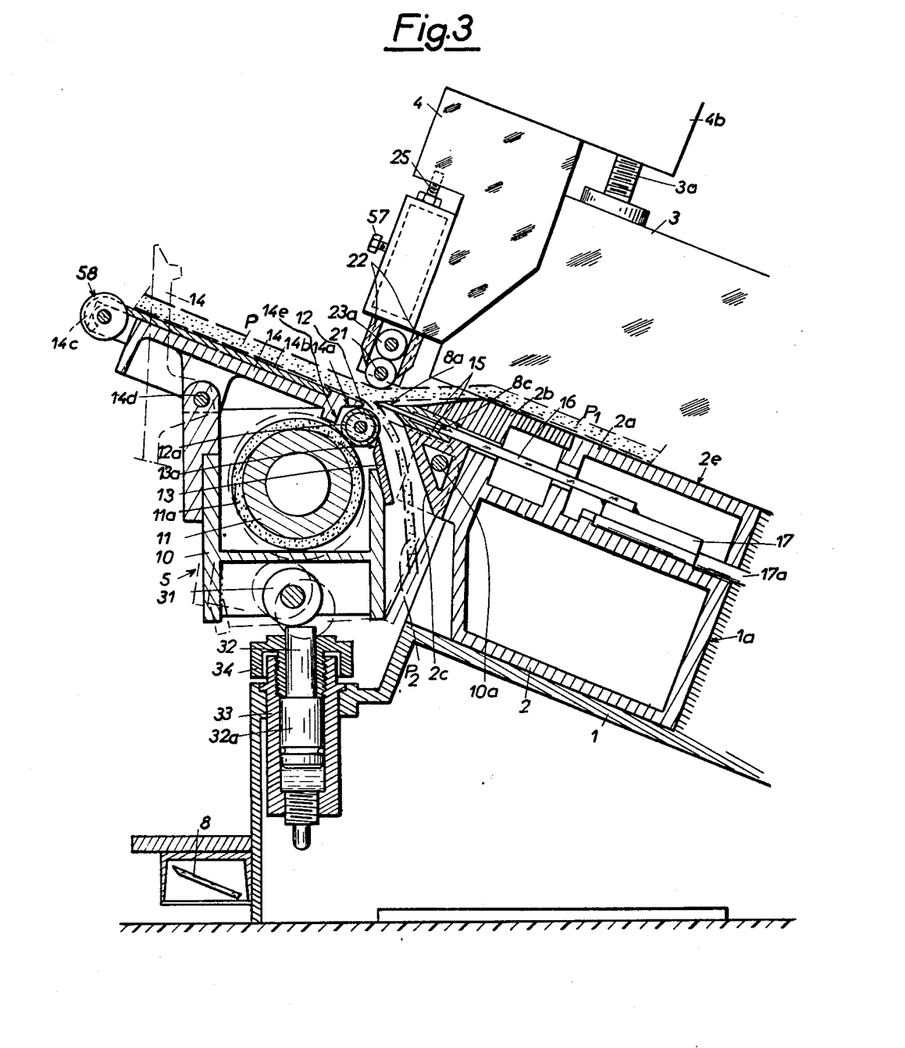
FIGURE 3 is a cross-sectional overall view of an embodiment of a machine according to the invention taken along broken lines 3—3—3 of FIG. 6.
Figure 4:
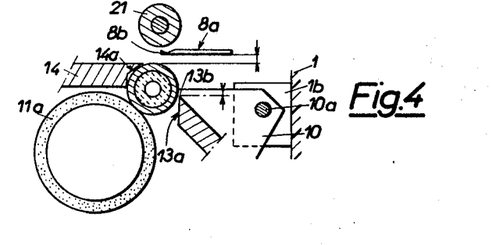
FIGURES 4 and 5 are diagrammatic views which illustrate portions of the machine of FIG. 3 corresponding to those of FIGS. 1 and 2 showing the unchangeable positions of the ring roller with respect to the supporting guide bar in different positions of adjustment of cutting thickness with respect to the blade.
Figure 5:
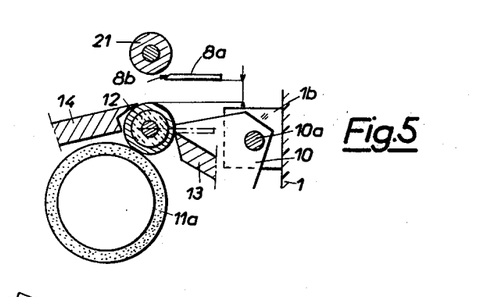

The ring roller 12 is positioned in friction contact with the cylinder 11, so as to be driven by said cylinder 11. On the other hand, fixed against the rear face of the block 10 in a judiciously adjusted position is a metal guide bar 13, whose upper edge is bevel-shaped to constitute a face 13a, against which bears the ring roller 12. The face 13a is limited by the upper edge 13b (FIGS. 3, 4 and 5).

The ring roller 12 is guided and kept in position between face 13a and face 14e of a table 14. Faces 13a and 14e are parallel.

The ring roller 12 is kept in position by bearing tangentially against a third support constituted by the inclined face 14a at the end of the setting or fixing table 14, said table being detachably fixed to the upper portion of the block 10. The table is mounted pivotably at 14d, so as to allow access to the interior of the block 10 in the position shown in broken lines in FIG. 3. The ring roller 12 is therefore supported in position by contact with surfaces 14a and 13a and the driving cylinder 11.

It is to be understood that a sufficient sector of the ring cylinder 12, over which the skins to be slit pass and are driven, appears freely between the supporting surfaces 13a and 14a.

It is significant to stress the sloping arrangement of the table 14 whose inclination corresponds to the inclination of the bed 2 and, more particularly, to the upper face 2a of said bed, although in a different plane. The face 2a constitutes a table for discharge of the main portions P1 of the skins P placed on the table 14 at the start of operation.

The upper traverse 8a of the endless blade 8 is slidingly guided between jaws 15 integrally connected to the bed 2, by any suitable means such as, for example, supports 2b–2c.

The cutting edge 8b of the blade 8 is positioned in a fixed plane between jaws 15, but can be adjusted in such plane with respect to the free sector of the ring roller 12, between the faces 13a, 14a.

Figure 8:
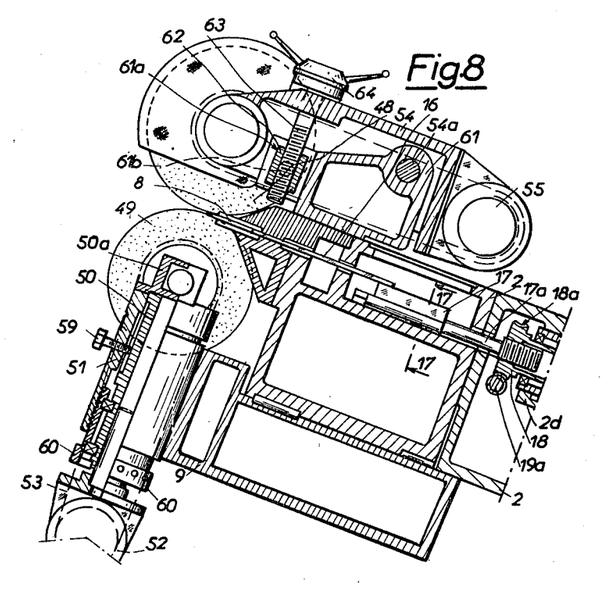
FIGURE 8 is a partial cross-section taken along line 8—8 in FIG. 6, which mainly illustrates the mounting of the sharpening grindstones.
Figure 17:
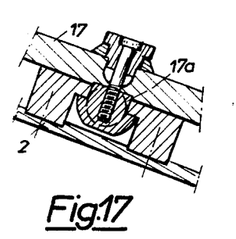
FIGURE 17 is a partial sectional view taken along and projected along line 17—17 of FIG. 8.

The fixed positioning of the upper traverse 8a of the blade to resist the cutting stress, with the possibility of a positional adjustment of the edge 8b by displacement in the plane of said upper traverse in response to the wear and tear to which the blade is subjected as it is being used and according to the cutting conditions, is obtained by means of contact pieces 16 housed and slidingly guided between the jaws 15. The contact pieces 16 bear with their free ends against the rear edge 8c of the blade (FIG. 12). The other ends of the contact pieces 16 are fixed to a plate 17 mounted and guided inside the bed 2 (FIG. 17). The plate 17 has projecting threaded rods 17a which cooperate with screw nuts 18 mounted in the bearing elements 2d of the bed 2 (FIG. 8). The screw nuts 18 form peripherally toothed wheels 18a cooperating with the screws 19a of a shaft 19 which is actuated from outside the machine by means, for example, of a handwheel 20 (FIG. 12).

A feed cylinder or roller 21 is located opposite that sector of the ring roller 12 which appears between the faces 13a–14a. The feed cylinder 21 is rotatably mounted at its ends in bearing supports 24h and 24i (FIG. 6) which are integral with the end elements 24 and 24b respectively of an articulated bridge, which will be described more fully hereinafter. In this manner, the feed cylinder 21 is adjusted parallel with and at the same time as the compensating cylinders as will be described hereinbelow.

The firm and rigid transverse guiding of the cylinder 21 is ensured by the guides 22 which extend the length of the cylinder and which are directly integral with, or detachably connected to the supporting members of the machine.

Several compensating cylinders, notably the three cylinders 23–23a–23b, are mounted above the cylinder 21 between the guides 22 so as to furnish support for said cylinder 21 against the various thrust forces it receives at different points of its length according to the variable thicknesses along the slitting length and depending on whether entire skins or "right" or "left" half-skins are slit.

The compensating cylinders are mounted in bearings which are integral with elements forming an articulated bridge. In the embodiment shown in the drawing, there are three elements 24–24a–24b, carrying the three abovementioned compensating cylinders. The middle cylinder 23a is mounted in the bearings 24c which are integral with the middle element 24a. The end cylinders 23–23b are mounted, respectively, on the one hand, in a bearing 24d integral with the element 24 and in a bearing 24e integral with the element 24b and, on the other hand, in swiveling bearing elements of the bearings 24c, so as to allow an angular displacement of limited amplitude of the cylinders 23 and 23b at their adjacent ends.

For this purpose, the end elements 24–24b of the articulated bridge are pivotably positioned at 24f and 24g respectively on the main bridge 4, and elastic means, such as springs 26 acting on capped rods 27 articulately fixed to said elements 24–24b, pivotably urge the end elements and their cylinders upwardly. The middle element 24a is fixedly secured to bridge 4.

For example, an assembly 25 constituted of a screw, nut and counter-nut permits to limit the pull of the springs and to adjust the position, i.e., whether inclined or not inclined, of said elements and of their cylinders in various combinations with respect to the elements and to the median cylinder. The screws 57 (FIGS. 6, 10) ensure transverse blocking of the articulated elements after their adjustment.

Figure 6:
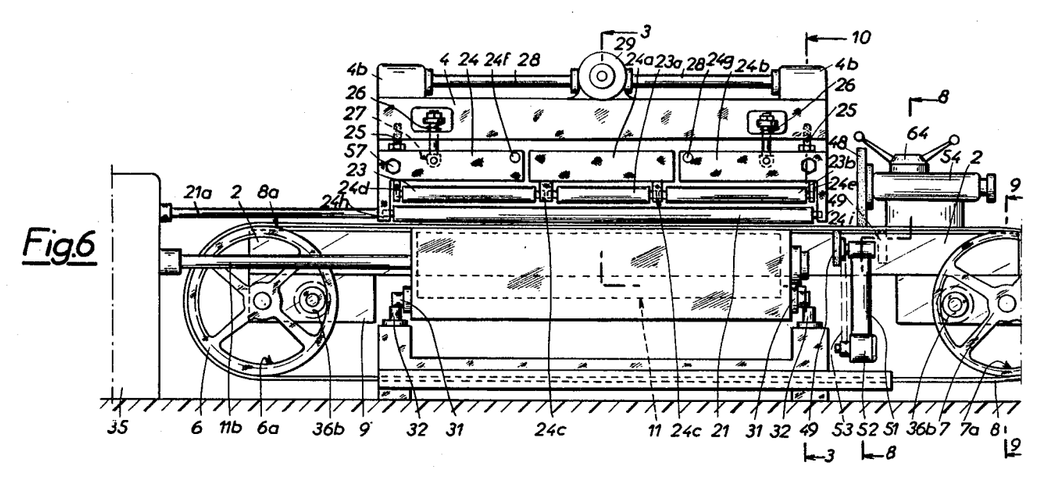
FIGURE 6 is a diagrammatic front elevation view of an embodiment of the entire machine according to the invention.
Figure 13:
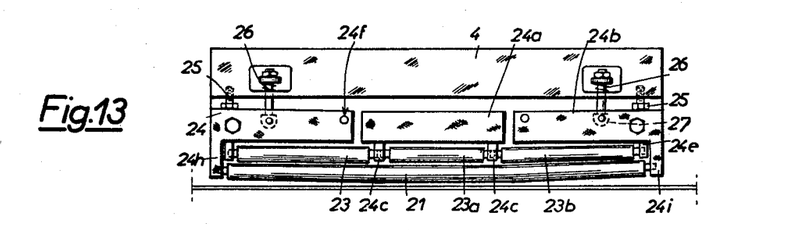
FIGURES 13, 14 and 15 are diagrammatic views which illustrate adjustment positions of the compensating cylinders and of the elements of the intermediate bridge.
Figure 14:
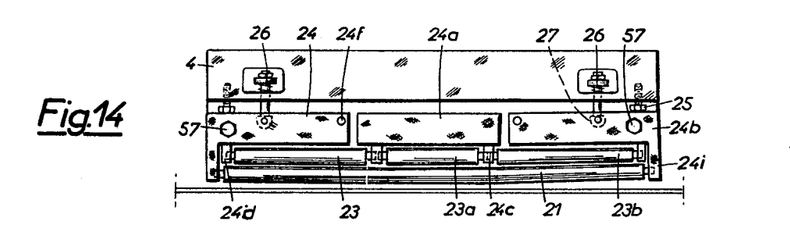
Figure 15:
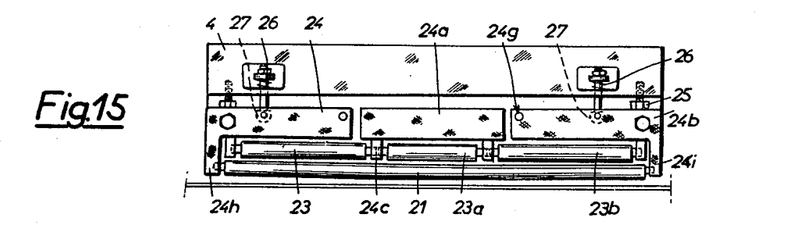
Figure 16:
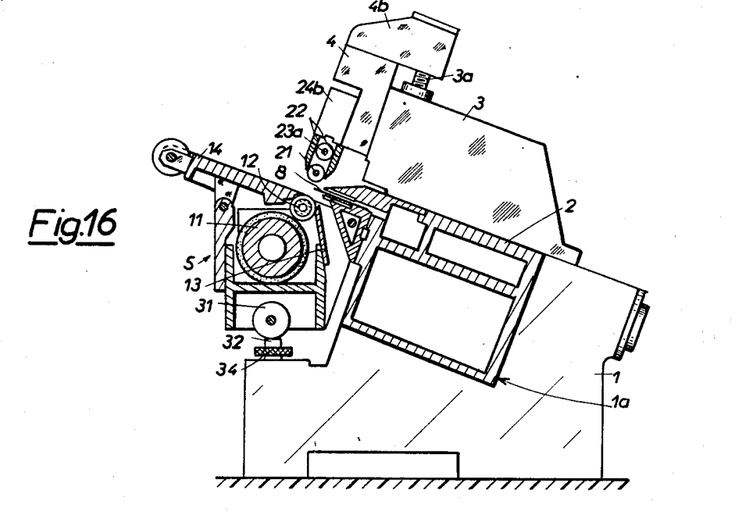
FIGURE 16 is an overall side view of the machine of the invention on a reduced scale.

The drawings show, particularly in FIG. 6, an aligned position of the elements of the articulated bridge and of their compensating cylinders. In FIG. 13, the end elements and compensating cylinders are inclined symmetrically, whereas in FIG. 14 only end element 24b and its compensating cylinder 23b is inclined while in FIG. 15 end element 24 and its compensating cylinder 23 are inclined. Said various adjustments correspond to the variable thicknesses and structures according to the various types, origins and make-ups of the slit hides and skins. In any case, the objective is to obtain uniform thicknesses for the main slit portions (grain-split side) despite the irregularities or unevenesses in thickness when the hides and skins are introduced into the machine.

The invention provides for a vertical adjustment of the rigid bridge 4 and of the assembly of members carried by said rigid bridge, so as to adjust with precision the space which separates the feed cylinder 21 from the cutting edge 8b of the traverse 8a of the blade 8.

For this purpose, the bridge 4, which is slidingly mounted on the front portion of the support 3, is integral at its ends with heads 4b which are penetrated by and support a shaft 28 (FIG. 6) driven by a reduction gear motor assembly 29 mounted, for example, in a central upper portion of the bridge 4.

Figure 10:
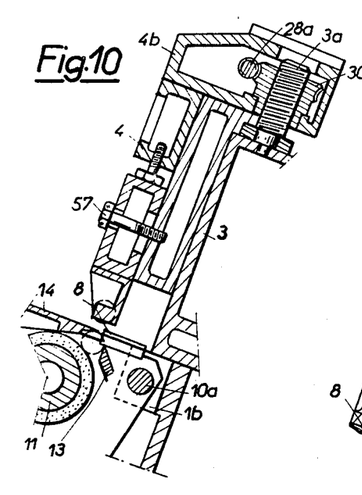
FIGURE 10 is a partial cross-sectional view taken along line 10—10 of FIG. 6, which illustrates the articulated bridge and the adjustable carrying bridge.

The ends of the shaft 28 carry directly or in a detachable manner screws 28a, (FIG. 10), each of which co-operates with a wheel 30 mounted in the bearing elements of said head 4b, in any known manner, so as to be freely rotatable and fixed in an axial direction in the supporting head (FIG. 10). The bore of each of the wheels 30 forms a nut cooperating with the threaded axles 3a integral with the supports 3. Thus by driving motor 29 in opposite directions, the bridge 4 can be raised or lowered.

On the other hand, the unit 5 with its assembly of members is also vertically adjustable as a unit, in order to adjust with precision the space which separates the ring cylinder 12 from the cutting edge 8b of the blade.

For this purpose, the block 10 is mounted pivotably on axle 10a in the bearing elements 1b of the frame, and the unit 5 carries laterally, at each of its ends, a roller 31 which bears against the outer extremity of a piston rod 32 of a single-acting hydraulic jack 33 mounted in the corresponding end of the frame 1. The piston rod has a shoulder 32a which, at the end of the stroke, abuts against the inner bearing surface of a ring 34 screwed into the cylinder of the jack 33. It is thus apparent that the degree of threaded engagement of the ring 34 in the jack 33 controls the stop position and the stroke of the piston rod. The ring 34 may have, on its outer bearing surface, any known means for rotating the ring for the purpose of adjustment as well as graduations for visibly indicating the adjusted position of the ring cylinder.

For their driving control, the cylinder 11 and the feed cylinder 21 are coupled, for example, by shafts 11b and 21a respectively, to a gear-down motor block 35 (FIG. 6) which may also contain a distributor-pump and hydraulic control system for operating the above-described cylinders. The cylinder 11 is in friction contact with ring roller 12 to drive the same in rotation.

It is understood that said arrangement and said driving system are offered by way of non-restrictive example only. It is to be noted that the driving speeds of the shafts 11b–21a and of the corresponding cylinders are different and are determined judiciously so as to obtain precisely equal linear speeds for the roller 12 and the cylinder 21, between which the hides to be slit pass and are driven.

Because of the inclined arrangement of the tables 14 and 2a, and of the blade 8, the introduction, the travel, the slitting of the hides and skins, and the discharge of the slit portions take place efficiently and rationally and assist the cutting effect of the blade. Special attention is drawn to the discharge of the secondary thicknesses or "flesh-splits" P², which takes place substantially vertically of the cutting line without friction or braking, thereby improving the cutting conditions. The table 14 and 2a may advantageously be covered with polished sheets or plates such as 14b and 2e which promote sliding. The front end of the plate 14b has a portion 14c of rounded shape to avoid snagging. Rollers 58 turn freely at the front end of the table 14 in grooves of the plate 14b, thereby facilitating the displacement and the advance of the skins.

A feature of the machine according to the invention resides in the fact that the two flywheels 6 and 7 are driving members so that, whatever the direction of motion of the blade 8, the cutting upper traverse 8a always operates in a tensioned state which is efficient and improves the quality and the conditions of the cut.

For the particular purpose of obtaining a simultaneous and perfectly synchronized driving of the flywheels 6 and 7, the invention provides for the use of hydraulic motors 36 (FIG. 7) which are fixed, for example, on the blocks 9 carrying said flywheels. The motors 36 drive respective shafts 36a and pinions 36b meshing with inner rings 6a–7a of the flywheels 6, 7.

Figure 7:
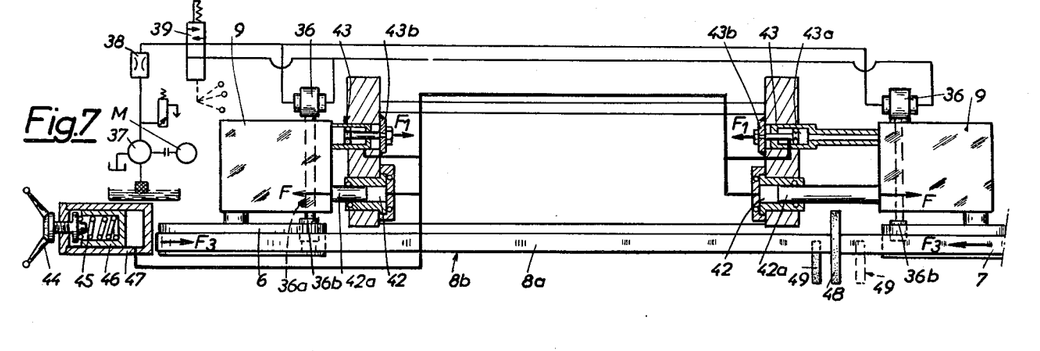
FIGURE 7 is a diagrammatic plan view which mainly shows the hydraulic system for driving the two-blade carrying flywheels, as well as the hydraulic system for tensioning the blade and balancing the stresses.

The motors 36 are connected in parallel with a supply pump 37 via a circuit having a safety valve 38, a flow regulator and a distributor 39 which permits changing the direction of flow of the fluid (FIG. 7). The necessary control apparatus completes this system. It is not necessary to describe in detail these known arrangements, whose use is, however, advantageous in this connection.

In particular, it suffices to actuate the distributor 39 to reverse the direction of flow of the fluid and, consequently, the driving direction of the motors 36, which reverses the direction of motion of the blade 8, depending on whether "right" or "left" half-skins are to be split, or for any other reason.

Figure 9:
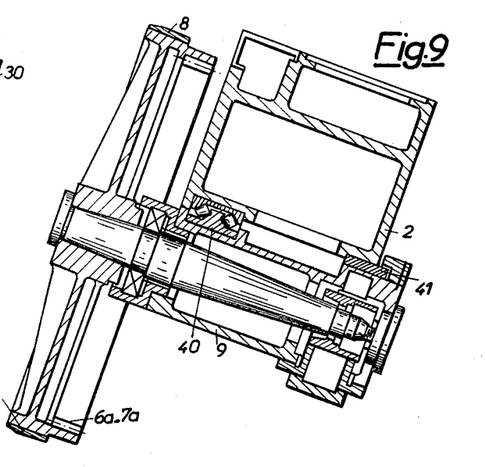
FIGURE 9 is a partial cross-sectional view taken along line 9—9 of FIG. 6 showing the mounting of the flywheels.

The blocks 9 are slidingly mounted with precise guiding at the ends of the bed 2 so that it is possible to adjust the distance between the flywheels 6 and 7 and thereby the tension of the blade 8. Said mounting is illustrated more particularly in FIG. 9 which shows the supporting bearing means 40 with crossed retaining rollers, with slide bars or other members, and the guide bar 41 integral with the bed 2, along which the slide blocks 9 are supported and retained.

The tension of the blade is controlled and adjusted by a system of hydraulic jacks illustrated in FIG. 7, which comprises hydraulic jacks 42 which are integral with the frame and which act against the slide blocks 9, so as to move them away from each other to stretch the blade. On the other hand, mounted parallel with the jacks 42 are hydraulic jacks 43 which are also integral with the frame or stand.

However, according to an important feature of the invention, the pressure of the hydraulic fluid is applied in opposite directions in the jacks 42 and 43, i.e., the pressure is exerted in the jacks 42 in the direction of the arrows F against the pistons 42a which urge the slide blocks 9 in a direction away from one another, whereas the hydraulic pressure in the jacks 43 is applied against the pistons 43a, so as to act in a direction opposite to the direction of the pressure in the jacks 42. For this purpose, the pistons 43a have a fixed position, for example, firmly connected to the frame by the outer plate 43b. The hydraulic pressure thus acts to displace the cylinder of the jacks 43 in the direction of the arrows F1, said cylinders 43 being integral with the blocks 9 and being mounted slidingly with respect to the frame.

The space which separates each jack 42 from its associated jack 43 is judiciously determined, as is the differential pressure in the jacks 42 and 43, whose different sections are calculated for developing forces F–F1 of different intensities in such a manner that the total of the forces F–F1 and the force F3 corresponding to the tensile stress on the blade 8 is balanced. Said balance or equilibrium eliminates the abnormal stresses on the elements of the machine and on the blade, thereby ensuring better operating conditions.

The tension imparted to the blade 8, which is applied by means of the jacks 42–43, is adjustable, for example, by means of a screw-type handwheel 44 such as is shown diagrammatically in FIG. 7. The screw type handwheel 44 actuates, by way of an elastic means such as a spring 45, a piston 46 which is slidable in a cylinder 47. The jacks and cylinders 42–43–47 form a fluid-tight and independent hydraulic circuit, which permits adjusting the pressure in the jacks and, consequently, the tension on the spring, while preserving for all adjustment positions, the above-indicated equilibrium. The handwheel 44 may, of course, be installed on a control panel of the machine.

Within the scope of the invention and in correlation with the other constructional features are the two sharpening grindstones, namely the upper sharpening grindstone 48 acting on the upper face of the blade to form the cutting edge 8b thereof, and the lower grindstone 49 sharpening the lower face of the blade at cutting edge 8b. In order to sharpen the beveled blade, it is necessary to have a shifted position of the two grindstones in which the upper grindstone operates upstream, i.e., contacts the blade first with respect to the direction of motion of the blade. In order to satisfy this arrangement, while enabling reversal of the direction of travel of the blade, the lower grindstone 49 is rotatably mounted in a grindstone-carrier 50a which is integral with a shaft 50 (FIG. 8). The latter can be displaced angularly with the grindstone in a sleeve 51 connected to the slide block 9. The lower end of the shaft 50 carries either directly or in a detachable manner a motor 52 driving the grindstone by way of a belt 53 (shown in broken lines). As seen in FIGS. 6 and 7, the axis of the shaft 50 and of the sleeve 51 is substantially in the plane of the upper grindstone 48, so that it is possible, by angularly displacing the grindstone 49, to selectively bring the same into positions on either side of the grindstone 48 as shown in broken lines in FIGS. 6 and 7, to satisfy the above-indicated condition to obtain good grinding. It is possible to employ any suitable system for locking shaft 50 and grindstone 49 in either position for example by means of screw 59. The angular positions of the shaft 50 and of the grindstone can be established by a spring and ball system. It is possible to control with precision the angular displacement of the shaft 50 and of the grindstone by a toothed ring system integral with said shaft and a wheel cooperating with said ring, said wheel being carried by a fixed support.

A screw nut 60 screwed into the lower portion of the sleeve 51 permits adjusting with precision the position of the grindstone 49 vertically. The screw nut 60 is mounted so as to drive the shaft 50 and the grindstone in axial direction, while being angularly independent of said shaft 50. The screw nut 60 is operated externally by any suitably known arrangement to be rotated.

As regards the upper grindstone 48, it is rotatably mounted in a grindstone carrying block 54 fixed on the bed 2. A motor 55 fixed on the block 54 drives the grindstone by a belt and pulley system (shown by broken lines in FIG. 8).

The grindstone 48 has a position which is vertically adjustable with respect to the plane of surface 8a of the blade 8. For this purpose, the block 54 is pivotably mounted on a shaft 54a mounted in a support 61 which is fixed to the bed 2. Lugs 61a of the support 61 carry, pivotably at 61b, a screw nut 62 cooperating with a control screw 63 actuated by means of a flywheel or an adjusting head 64. The screw 63 is axially integral with the block 54, while being rotatably independent of said block.

Sharpening under good conditions requires a support at the back of the blade in the sharpening zone. This support is supplied by at least one contact piece 56, as illustrates diagrammatically in FIG. 12. The contact piece 56 is mounted slidingly inside the bed 2, and said contact piece bears with one edge against the rear edge 8c of the blade 8, in the same manner as the contact pieces 16. The contact piece 56 is fixed at its opposite edge to an extended portion of the plate 17, and, consequently, the adjustment of the contact pieces 16 and 56 is effected simultaneously and in synchronized manner which simplifies the frequent adjustment mechanism, and thus brings about a perfect alignment of the cutting portion 8a of the blade from the sharpening zone to the end of the cutting zone.

Reference will next be made to the embodiment shown in FIGS. 18–23 which includes several modifications when compared to the previously described embodiment. In FIGS. 18–23, the elements which are similar to those in the previously described embodiment will be given the same reference characters.

Although the lower traverse 8d of the blade 8 is not subjected to any cutting stress, the invention provides, due to the inclined working planes, for contact pieces against the rear edge 8e of the part 8d of the blade, in order to keep same in alignment with the upper traverse without abnormal stresses. For this purpose, according to the embodiment of FIG. 18, contact pieces are provided in the form of shoulders 65 which give support to the rear edge 8e of the lower reach of the blade. There are as many contact pieces as can expediently be placed along the lower traverse 8d. The contact pieces 65 are supported and connected by a common plate or carriage 66 which is displaceable by the actuation of one or more screws 67 mounted rotatably in the bearing 68. The screw or screws 67 are driven by a manual control in synchronism with the contact pieces 16 which support the rear edge of the upper traverse of the blade. The control for displacing the contact pieces on the upper and lower traverses may also be effected in synchronism by a single electric-motor control.

In an advantageous manner, it is preferred to displace synchronously, in fully automatic manner, the contact pieces 16 and 65 of the lower and upper traverses of the blade 8 in proportion to the wear of the upper traverse 8a, said wear being due both to the cutting operation and to the action of the grindstones.

Figure 18:
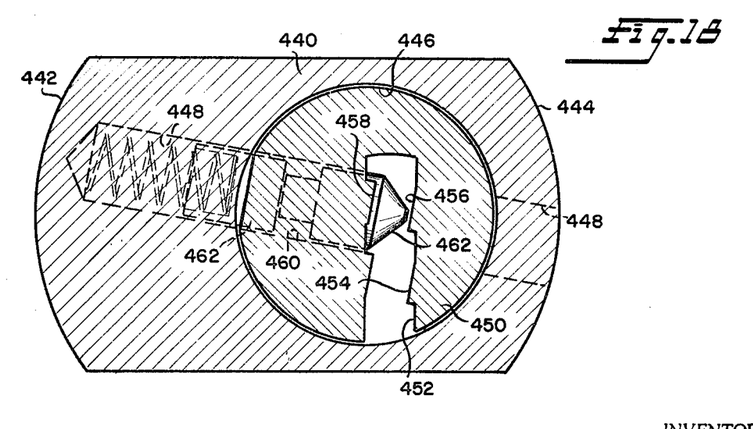
FIGURE 18 is an overall cross-sectional view of a second embodiment of a machine according to the invention showing several refined arrangements for the machine.
Figure 19:
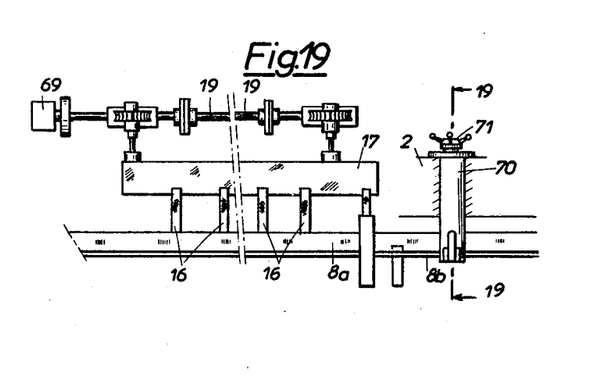
FIGURE 19 illustrates diagrammatically, with a longitudinal interruption, the automatic feed and control system of the blade as a function of its wear.
Figure 20:
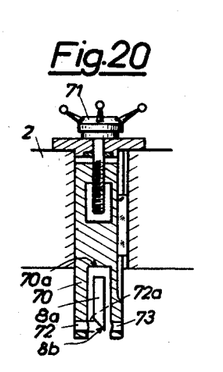
FIGURE 20 shows, on a larger scale, a cross-section taken along line 19—19 of the adjustable support of the cell and bulb system with respect to part of the blade.

For this purpose, the control shaft 19 of the contact pieces is not actuated by a hand-wheel as described above in conjunction with the previous embodiment, but in the embodiment of FIGS. 18–23 the shaft is driven by means of a gear-down motor 69 which is operated by the excitation of a photo-electric cell system, which is shown in FIG. 19 and, on a larger scale, in FIG. 20. Said system comprises a base 70 secured in a fixed member of the machine, such as the bed 2, or the supports 2b–2c. The mount 70 has a fixed angular position, for example, by a keying system, and it can be displaced in axial direction, in a precise manner, by means of a rotatable screw 71 which is mounted in fixed axial position. The screw 71 is screwed into the mount 70. The mount 70 is provided with a slot 70a at its free end to allow free passage of the traverse 8a of the blade. Mounted on either side of the opening 70a are, on the one hand, an emitting bulb 72 and, on the other hand, a receiving cell 73. The mount 70 is positioned with precision, so that the ray 72a of the emitting lamp is normally hidden by the cutting edge 8b of the traverse 8a of the blade.

It will be understood that a slight wear of the edge 8b allows passage of the luminous ray which reaches the cell 73 and automatically operates the gear-down motor 69 by suitable excitation means (not shown). The shaft 19 is actuated, and, consequently, the contact pieces 16 as well as the contact pieces 65 are advanced under the conditions described hereinabove. As soon as the cutting edge 8b again blocks the ray 72a, the excitation of the gear-down motor 69 ceases and the shaft 19 is stopped.

The fully automatic control for advancing the traverses of the blade may exist on the machine together with a manual control and even a semi-automatic control which manually induces operation of the gear-down motor 69. Control buttons can then be provided which will permit selective activation of the corresponding circuits.

In order to make it possible to change, during the operation of the machine, the profile of the feed cylinder 21 in accordance with the cutting characteristics and conditions which may vary with each hide, a hydraulic control permits to act so as to change the inclination of the end elements 24–24b of the intermediate bridge, which are articulated at 24f–24g.

In this case, the screws 57 for locking the articulated elements after adjustment are unlocked. The screws 25, which limit the upward displacement of the articulated elements under the action of springs 26, supportingly cooperate with the pistons 74 of single-acting jacks 75 formed in the pivoting end elements 24–24b. Depending on whether or not the jacks 75 are put under pressure, the compensating cylinders and the cylinder 21 are given a rectilinear or more or less inclined position, according to the pressure.

Figure 21:
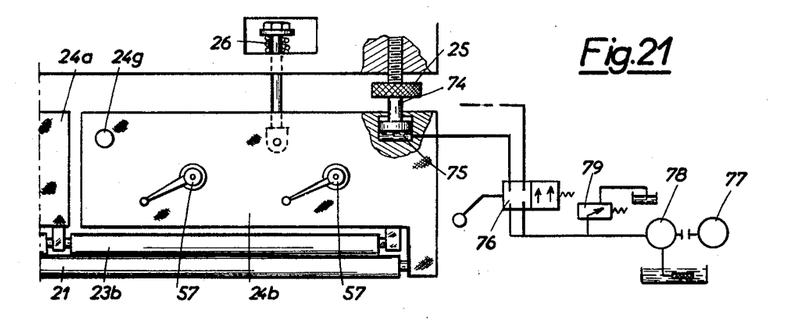
FIGURE 21 shows, by way of a diagrammatic view relating to an end of the intermediate bridge and of the driving roller, the hydraulic system controlling the variation, during the functioning of the machine, of the positional adjustment of the driving roller by the end elements of the intermediate bridge with their compensating cylinders.

In order to make the adjustment of the articulated elements while a hide passes through the machine, the operator acts on a distributor valve 76 mounted in feed circuits of the two jacks 75 (only that one of said jacks for the articulated element 24b is illustrated in FIG. 21). The distributor valve 76 has various positions which permit controlling the pressure or the evacuation of either jack or of both jacks at the same time. The jacks are fed from a motor 77, a hydraulic pump 78, the pressure of the fluid in the circuit being regulated by a calibration valve 79.

Figure 22:
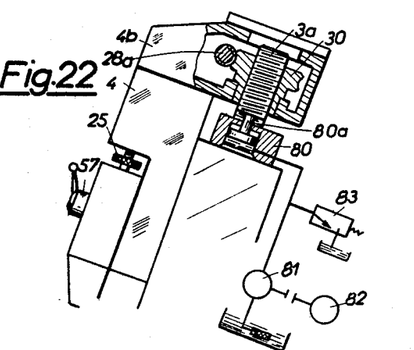
FIGURE 22 is a diagrammatic side view of the hydraulic system for taking up the play between the rigid supports and the main bridge of the machine.
Figure 23:
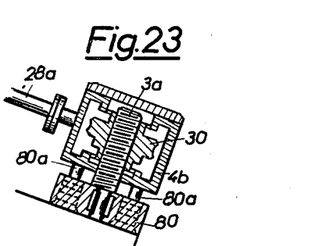
FIGURE 23 is a partial cross-sectional front view corresponding to FIG. 22.

FIGS. 22 and 23 show hydraulic arrangements which ensure the constant and automatic take-up of play between the wheels 30 screwed on the axles 3a, which permit the adjustment of the level of the main bridge 4 of the machine.

The jacks 80 are supported on the fixed supports 3 of the machine, and their pistons 80a act against the heads 4b of the bridge 4. The jacks 80 are supplied with fluid under pressure from a hydraulic pump 81 driven by an electric motor 82. A discharge valve 83 limits the pressure of the fluid to such a value that the upward thrust exerted by the pistons 80a and applied to the heads 4b is slightly but not excessively greater than the weight of the bridge and of all members and mechanisms carried by said bridge.

Said arrangement for constantly taking up the play results in a permanently maintained space of great precision which separates the cylinders 21 and 12. Consequently, the slitting operation is constant and very precise at all times.

It also falls within the scope of the present invention to take up the play by any other means known for this purpose, particularly by mechanical means which can be actuated periodically, or by elastic means of constant pressure.

According to the embodiment in FIG. 18 single-acting hydraulic jacks 33 are mounted at the ends of the frame or stand 1 and the piston rod 32 of said jacks acts as an adjustable stop against the rollers 31 or any other supporting point of the unit 5 carrying the ring roller 12. The invention provides, within the scope of the present embodiment, to apply to the ring roller 12 a constant pressure against the hide to be slit, in spite of variations in thickness which lead to momentary, sometimes sizeable overpressures.

For this purpose, the pressure of the fluid applied to the pistons 32 is predetermined and regulated in such a manner that, in case of excess pressure due to increased thicknesses, the pistons can be forced back somewhat, thereby maintaining an even pressure on the hide engaged in the machine. For this purpose, a pump 84 for feeding the jacks is driven by a motor 85, and there is mounted, in the feed circuit of the jacks, a discharge valve 86 calibrated so as to become operative with overpressure exerted on the pistons 32. The pump-motor system may be the same as the pump-motor assembly 81–82 mounted for taking up the play of the threaded members for adjusting the level of the main bridge.

The features and advantages of the improved slitting machine according to the invention are readily apparent, however, special attention is drawn to the following:

The inclined arrangement of the tables for the introduction and discharge of the hides and skins with a corresponding arrangement of the slitting means;

The fixed relative position of the ring roller and its supporting guide-bar in spite of adjustments of the space which separates said ring roller from the blade;

The great number of adjustment possibilities according to the thicknesses and structures of the hides and skins by means of the bridge consisting of articulated elements and carrying the compensating cylinders;

The driving of the blade by means of two flywheels actuated simultaneously by a motor and the quick and convenient reversal of the direction in which the blade is driven as a function of the skins or half-skins and of the positions of their portions of maximum thickness;

The balancing and the adjustment of the stresses on the machine and with respect to the blade;

The possibility of a rational sharpening and of a perfect cut, whatever the direction in which the blade is driven;

The corresponding and simultaneous adjustment of the supporting contact pieces both at the back of the cutting part of the blade and in the sharpening zone;

The various adjustments.

Numerous modifications and variations of the disclosed apparatus will be readily apparent to those skilled in the art without departing from the scope and spirit of the invention as defined in the attached claims.

What is claimed is:

1. A machine for slitting hides along their thicknesses comprising a rigid frame, cutting means for slitting the hides supported in the frame in an inclined position with respect to the horizontal, first and second roller means located in spaced relation adjacent the cutting means for respectively engaging the hides at their upper and lower surfaces to advance the hides to the cutting means, an assembly supported from said frame and supporting one of said roller means therein, said assembly including a guide bar in fixed position with respect to said one roller means and having a surface in contact therewith, a driving cylinder in frictional contact with said one roller means for driving the same in rotation, and a table for receiving the hides, said table including an end portion with a surface in contact with said one roller means, said one roller means being adjustable in position with respect to the cutting means to compensate for thickness variation of the hide by adjustment of the position of the assembly with respect to the frame, and means yieldably supporting said assembly from the frame for producing a substantially uniform force of the said one roller means on the hides to be slit.

2. A machine as claimed in claim 1 wherein said frame includes a bed with an inclination with respect to the horizontal, said cutting means being supported on the bed and assuming the inclination thereof.

3. A machine as claimed in claim 1 comprising a rigid main bridge adjustably supported on the frame, said bridge supporting the other of said roller means.

4. A machine as claimed in claim 1 wherein said cutting means comprises an endless blade, a pair of flywheels supported from the frame and around which passes the endless blade for being driven by said flywheels, and means for driving the flywheels in synchronization in opposite directions whereby the direction of travel of the endless blade can be reversed.

5. A machine as claimed in claim 4, comprising slide blocks mounted on the frame for displacement and supporting a respective flywheel, two hydraulic jacks acting on each slide block to adjust the position thereof with respect to the frame and the tension in the blade, each pair of jacks exerting pressure on the associated slide blocks in respectively opposite directions to produce a resultant force which is opposite that of the other pair of jacks and in equilibrium with the tensile force exerted in the blade.

6. A machine as claimed in claim 5, comprising a hydraulic circuit for feeding the jacks with pressure fluid and means in said circuit for adjusting the pressure of said fluid comprising a cylinder and a displaceably lockable piston in said cylinder.

7. A machine as claimed in claim 4, wherein said endless blade is driven along a path of travel having an upper and a lower traverse, said machine further comprising upper and lower grindstones displaced with respect to one another along the upper traverse of the blade to act thereon.

8. A machine as claimed in claim 7 wherein one of said grindstones is supported in a fixed angular position, the machine further comprising means supporting the other of the grindstones for angular movement between first and second symmetrical positions with respect to the fixed grindstone along the upper traverse, said other grindstone being rotatable about an axis which is coaxial with the fixed grindstone, said other grindstone being immobile in selected of said positions dependent upon the direction of travel of the blade.

9. A machine as claimed in claim 7 comprising means supporting said grindstones for vertical adjustment with respect to the plane of the upper traverse of the blade.

10. A machine as claimed in claim 1 wherein said end portion of the table has a guide surface which extends parallel to said surface of the guide bar which contacts said one roller means.

11. A machine as claimed in claim 1 wherein said frame has an inclined surface downstream of the cutting means for receiving the upper portion of the slit hides, the latter surface, the cutting means and the table having similar inclinations such that the lower portion of the slit hides is discharged in a substantially vertical position.

12. A machine as claimed in claim 1 wherein said assembly comprises a block supporting said guide bar, said one roller means, said driving cylinder and said table, and means pivotally supporting the table from the block.

13. A machine as claimed in claim 1 wherein said means yieldably supporting the assembly from the frame including a single acting jack mounted in said frame and including a projecting piston supporting the assembly and an adjustable stop ring in said jack engaging said piston for controlling the degree of projection thereof.

14. A machine as claimed in claim 13 wherein said means for obtaining substantially constant force of said one roller means against the hides comprises a pump supplying the jack with pressure fluid and a discharge valve coupled to the jack to provide constant pressure of the fluid therein.

15. A machine as claimed in claim 1 wherein the other of said roller means is a driven roller, the machine further comprising a main bridge supported on the frame and supporting the driven roller, a plurality of compensating cylinders bearing against the driven roller to receive thrust therefrom when the driven roller engages the upper surfaces of the hides, a plurality of elements each supporting a compensating cylinder and constituting an intermediate bridge supported from the main bridge, at least one of said elements being supported from said main bridge for adjustment to assume an inclined position with respect to the other elements, said compensating cylinders undergoing relative angular adjustment upon relative inclination of the elements of the intermediate bridge.

16. A machine as claimed in claim 15 wherein the end elements of the intermediate bridge are angularly adjustable, the associated compensating cylinders being adjustable therewith, the machine further comprising means for locking the end elements after adjustment thereof.

17. A machine as claimed in claim 16 comprising means between the main bridge and the frame for adjusting the level of the main bridge relative to the frame, the latter means comprising a threaded axle and a wheel threadably on said axle, said wheel and axle being mounted respectively on the bridge and frame, and a driven shaft engaging the wheel to drive the same in rotation and produce relative movement between the main bridge and frame.

18. A machine as claimed in claim 17 comprising means insuring engagement without play between the main bridge and the frame.

19. A machine as claimed in claim 18 wherein said means insuring engagement without play between the main bridge and the frame comprises a single acting jack supported on said frame including a piston exerting upward pressure, a discharge valve for limiting the pressure to a pre-established magnitude, said piston supporting the main bridge which rests thereon, said pre-established pressure being such as to produce a force slightly greater than the weight of the bridge and the structure carried thereby.

20. A machine as claimed in claim 16 comprising means for adjusting the angular position of each of the end elements of the intermediate bridge comprising a hydraulic system for supplying pressure fluid, a distributor valve in said system and a single-acting jack operative on an associated end element to adjust the position thereof.

21. A machine as claimed in claim 1 wherein said first and second roller means are constituted by respective rollers, the machine comprising means for driving the rollers at suitable angular speeds so that the linear speeds will be substantially equal.

22. A machine as claimed in claim 1, wherein said cutting means includes an endless blade and grinding means for maintaining a sharp cutting edge on said blade.

23. A machine as claimed in claim 1 wherein said cutting means includes an endless blade which is driven along a path having an upper and lower traverse, the machine further comprising means supported in the frame for supporting the rear edge of the blade along the upper traverse thereof, the latter said means comprising a plate slidably mounted in said frame along said inclined position, a plurality of contact pieces secured to said plate in engagement with the rear edge of the blade at said upper traverse, and means accessible externally of the frame for adjusting the position of the plate.

24. A machine as claimed in claim 23 comprising sharpening means located along the upper traverse of the blade for sharpening the same, and a further contact piece supported from the plate and in contact with the blade at the rear edge thereof adjacent said sharpening means, the further contact piece being moved in synchronization with the other contact pieces upon slidable displacement of the plate.

25. A machine as claimed in claim 1 wherein said cutting means including an endless blade which is driven along a path having an upper and lower traverse, the machine further comprising first and second means supported in the frame for adjustably supporting the rear edge of the blade respectively at the upper and lower traverse.

26. A machine as claimed in claim 1 comprising means supporting the cutting means for displacement and means for displacing the cutting means to compensate for wear thereof.

27. A machine as claimed in claim 26 wherein said cutting means comprises a blade having a cutting edge, said means for displacing the cutting means to compensate for wear thereof comprising means for displacing the blade and a photo-electric cell system operative on said cutting edge and coupled to said means which displaces the blade to activate the same until the blade cutting edge renders the cell system inactive.

28. A machine as claimed in claim 27 wherein said photo-electric cell system has a lamp emitting a ray, said cutting edge of the blade being positioned to block the ray and render the system inactive, a photo-electric cell opposite said ray for receiving the same when the cutting edge is worn, said cell energizing said means which displaces the blade to cause the displacement thereof until the cutting edge blocks the ray.

29. A machine as claimed in claim 28 comprising means supporting the lamp and cell on respective opposite sides of the blade in fixed angular position but for displacement transversely of said blade for accurate positioning with respect to the cutting edge of the blade.

30. A machine as claimed in claim 29 comprising manual means and semi-automatic means coupled to the means for displacing the blade, and a control mechanism for selectively rendering active and inactive the manual means, the semi-automatic means and the photo-electric cell system.

(References on following page)

References Cited

UNITED STATES PATENTS

| | | | |
|---|---|---|---|
| 74,734 | 2/1868 | Vittum | 69—10 X |
| 1,075,792 | 10/1913 | Quigley | 69—10 |
| 1,382,755 | 6/1921 | Baxter | 69—10 |
| 1,459,933 | 6/1923 | Stauder. | |
| 2,154,115 | 4/1939 | Stehling | 69—10 |
| 2,524,013 | 9/1950 | Hall | 69—10 |
| 2,532,398 | 12/1950 | Fehlmann | 69—10 |
| 2,804,141 | 8/1957 | Danner | 69—10 X |
| 3,060,714 | 10/1962 | Weber | 69—10 |
| 3,083,559 | 4/1963 | Eberhardt | 69—10 |

PATRICK D. LAWSON, *Primary Examiner.*

A. R. GUEST, *Assistant Examiner.*